United States Patent [19]
Walter

[11] Patent Number: 5,775,074
[45] Date of Patent: Jul. 7, 1998

[54] VERSATILE POWER MECHANISM FOR USE WITH A PLURALITY OF OUTDOOR APPLIANCES

[76] Inventor: Dennis G. Walter, 6471 El Jardin St., Long Beach, Calif. 90815

[21] Appl. No.: 689,484

[22] Filed: Aug. 8, 1996

[51] Int. Cl.[6] .................................................. A01D 34/78
[52] U.S. Cl. ............................. 56/11.9; 56/2; 56/DIG. 9; 310/91
[58] Field of Search ..................................... 56/11.9, 16.7, 56/2, DIG. 9; 310/89, 91, 50, 47

[56] References Cited

U.S. PATENT DOCUMENTS

| 4,333,302 | 6/1982 | Thomas et al. | 56/11.9 X |
| 4,625,134 | 11/1986 | Weaver | 310/91 X |
| 5,126,607 | 6/1992 | Merriman, Jr. | 310/91 X |

FOREIGN PATENT DOCUMENTS 2201842  9/1988  United Kingdom ................... 310/91

*Primary Examiner*—Terry Lee Melius

[57] ABSTRACT

A versatile power mechanism for use with a plurality of outdoor appliances including a versatile power mechanism releasably coupleable to the outdoor appliances, the power mechanism having a rotor extending therefrom and adapted to rotate upon the activation thereof, a power cord with a first end coupled to the power mechanism and a second end releasably couplable to a conventional alternating current receptacle for receiving power therefrom, and a power switch situated on the top face of the power mechanism and adapted to allow the selective activation of the power mechanism thus providing mechanical motion to the outdoor appliance.

2 Claims, 3 Drawing Sheets

5,775,074

1

VERSATILE POWER MECHANISM FOR USE WITH A PLURALITY OF OUTDOOR APPLIANCES

BACKGROUND OF THE INVENTION

1. Field of the Invention

The present invention relates to a versatile power mechanism for use with a plurality of outdoor appliances and more particularly pertains to utilizing a common power mechanism for a plurality of outdoor appliances.

2. Description of the Prior Art

The use of outdoor appliances is known in the prior art. By way of example, U.S. Pat. No. 4,411,125 to Strickland; U.S. Pat. No. 4,308,676 to Doane; U.S. Patent Des. 285,079 to Huthmacher; U.S. Pat. No. 5,095,687 to Andrew et al.; U.S. Pat. No. 5,287,683 to Smith; U.S. Pat. No. 4,642,976 to Owens; and U.S. Pat. No. 4,488,395 to Mack are provided as being of general interest.

In this respect, the versatile power mechanism for use with a plurality of outdoor appliances according to the present invention substantially departs from the conventional concepts and designs of the prior art, and in so doing provides an apparatus primarily developed for the purpose of utilizing a common power mechanism for a plurality of outdoor appliances.

Therefore, it can be appreciated that there exists a continuing need for a new and improved versatile power mechanism for use with a plurality of outdoor appliances which can be used for utilizing a common power mechanism for a plurality of outdoor appliances. In this regard, the present invention substantially fulfills this need.

SUMMARY OF THE INVENTION

In view of the foregoing disadvantages inherent in the known types of outdoor appliances now present in the prior art, the present invention provides an improved versatile power mechanism for use with a plurality of outdoor appliances. As such, the general purpose of the present invention, which will be described subsequently in greater detail, is to provide a new and improved versatile power mechanism for use with a plurality of outdoor appliances.

To attain this, the present invention essentially comprises a lawn mower with a generally rectangular configuration having a closed top face, an open bottom face, and a periphery formed therebetween with a plurality of wheels rotatably coupled thereto for allowing maneuvering of the lawn mower and a handle pivotally coupled thereto for further facilitating such maneuvering, the top face of the lawn mower having a first inset circular portion centrally formed therein, a second inset circular portion centrally formed in the first inset circular portion, and a drive aperture formed centrally in the second inset circular portion, the top face of the lawn mower further having a plurality of securement pins coupled to the first inset circular portion and extending upwardly therefrom and a plurality of apertures formed in the first inset circular portion; and a versatile power mechanism with a cylindrical configuration having a top face, a bottom face, and a periphery formed therebetween, the power mechanism having an annular flange integrally formed on the bottom face of the power mechanism, a pair of handles coupled to an upper surface of the flange at opposite ends of the power mechanism for allowing the convenient transportation thereof, a plurality of securement apertures positioned on the flange and adapted to releasably receive the securement pins of the lawn mower

2 thus allowing the selective securement of the power mechanism to the top face of the lawn mower, a plurality of apertures formed in the flange in alignment with the apertures of the top face of the lawn mower upon the securement of the securement pins within the securement apertures, and a plurality of coupling pins adapted to releasably insert within the apertures of the power mechanism and the lawn mower thus further securing the power mechanism to the top face of the lawn mower, the power mechanism further having a threaded rotor extending from the bottom face thereof and adapted to rotate upon the activation thereof with the rotor further adapted to insert within the drive aperture of the lawn mower, a power cord with a first end coupled to the top face of the power mechanism and a second end releasably couplable to a conventional alternating current receptacle for receiving power therefrom, and a power switch situated on the top face of the power mechanism and adapted to allow the selective activation of the power mechanism thus providing mechanical motion to the lawn mower, whereby the power mechanism may be releasably situated on a plurality of outdoor appliances for providing mechanical motion thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved versatile power mechanism for use with a plurality of outdoor appliances which has all the advantages of the prior art outdoor appliances and none of the disadvantages.

It is another object of the present invention to provide a new and improved versatile power mechanism for use with a plurality of outdoor appliances which may be easily and efficiently manufactured and marketed.

It is a further object of the present invention to provide a new and improved versatile power mechanism for use with a plurality of outdoor appliances which is of a durable and reliable construction.

An even further object of the present invention is to provide a new and improved versatile power mechanism for use with a plurality of outdoor appliances which is susceptible of a low cost of manufacture with regard to both materials and labor, and which accordingly is then susceptible of low prices of sale to the consuming public, thereby making such versatile power mechanism for use with a plurality of outdoor appliances economically available to the buying public.

Still yet another object of the present invention is to provide a new and improved versatile power mechanism for use with a plurality of outdoor appliances which provides in the apparatuses and methods of the prior art some of the advantages thereof, while simultaneously overcoming some of the disadvantages normally associated therewith.

Another object of the present invention is to provide a quick-release coupling mechanism for allowing convenient removal of the power mechanism from an outdoor appliance.

Yet another object of the present invention is to minimize required storage space of outdoor appliances.

Still another object of the present invention is to utilize a common power mechanism for a plurality of outdoor appliances.

Lastly, it is an object of the present invention to provide a new and improved versatile power mechanism for use with a plurality of outdoor appliances including a plurality of outdoor appliances; and a versatile power mechanism releasably coupleable to the outdoor appliances, the power mechanism having a rotor extending therefrom and adapted to rotate upon the activation thereof, a power cord with a first end coupled to the power mechanism and a second end releasably coupleable to a conventional alternating current receptacle for receiving power therefrom, and a power switch situated on the top face of the power mechanism and adapted to allow the selective activation of the power mechanism thus providing mechanical motion to the outdoor appliance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
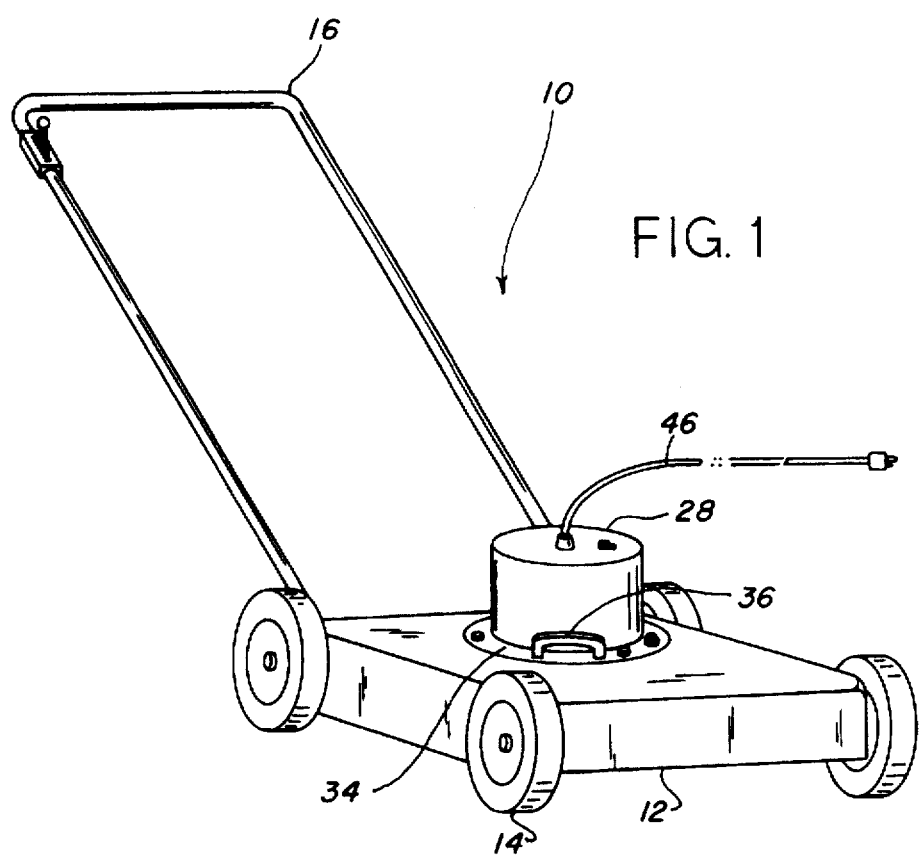
FIG. 1 is a perspective illustration of the preferred embodiment of the versatile power mechanism for use with a plurality of outdoor appliances constructed in accordance with the principles of the present invention.

With reference now to the drawings, and in particular to FIG. 1 thereof, a new and improved versatile power mechanism for use with a plurality of outdoor appliances embodying the principles and concepts of the present invention and generally designated by the reference numeral 10 will be described.

The present invention, the new and improved versatile power mechanism for use with a plurality of outdoor appliances, is comprised of a plurality of components. Such components in their broadest context include an outdoor appliance and versatile power mechanism. Such components are individually configured and correlated with respect to each other so as to attain the desired objective.

Figure 2:
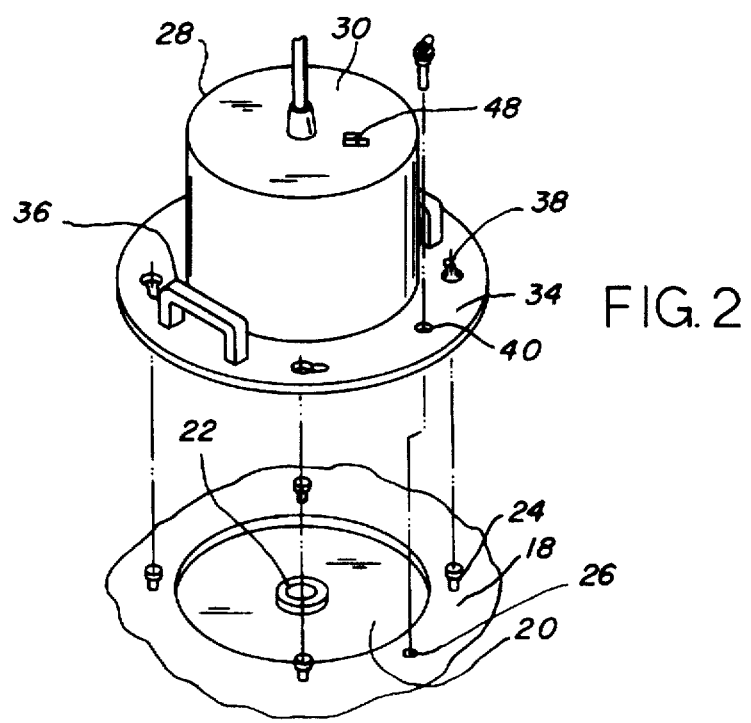
FIG. 2 is an exploded view of the present invention in a disassembled orientation.
Figure 3:
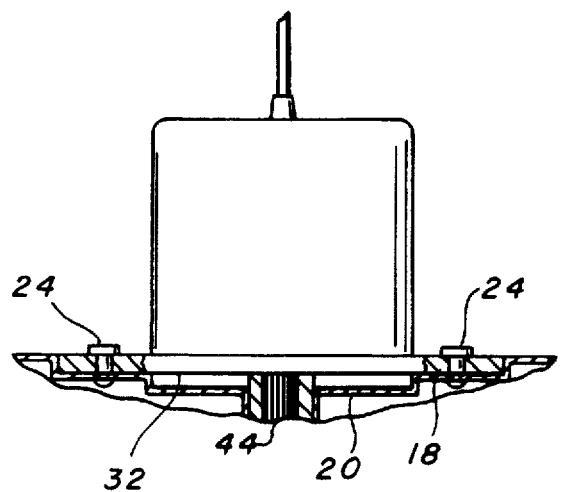
FIG. 3 is a side elevational view of the power mechanism of the present invention.
Figure 4:
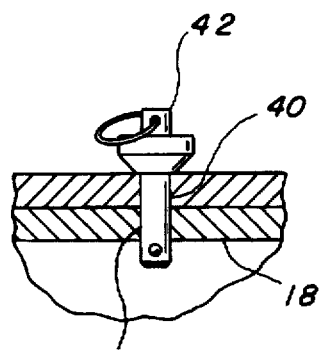
FIG. 4 is a cross-sectional view of the present invention in an assembled orientation showing one of the pins utilized as a coupling mechanism.

More specifically, it will be noted that the system 10 of the present invention includes a plurality of outdoor appliances including but not limited to a lawn mower, roto tiller, snow blower, water pump, air compressor, leaf mulcher, leaf blower, airless sprayer, weed sprayer, and lawn edger. In the preferred embodiment, one of such appliances includes a lawn mower 12. The lawn mower has a generally rectangular configuration with a closed top face, an open bottom face, and a periphery formed therebetween. A plurality of wheels 14 are rotatably coupled to the periphery of the lawn mower for allowing maneuvering of the lawn mower. A handle 16 is also pivotally coupled thereto for further facilitating such maneuvering. The top face of the lawn mower has a first inset circular portion 18 centrally formed therein. A second inset circular portion 20 is centrally formed in the first inset circular portion. The second inset circular portion has a diameter slightly less than that of the first inset circular portion. Also included is a drive aperture 22 formed centrally in the second inset circular portion. Preferably, the drive aperture is lined with a shaft which extends upwardly beyond the second inset circular portion a distance equal to the depth of second inset circular portion. As can be seen in FIG. 2, the top face of the lawn mower further has a plurality of securement pins 24 coupled to the first inset circular portion. Such pins extend upwardly from the first inset circular portion. Ideally, the pins each include a post with a first end coupled to the lawn mower and a second end with a small disk integrally formed thereon. Further provided is a plurality of apertures 26 formed in the first inset circular portion.

It should be noted that in alternate embodiments, wherein different appliances are utilized, the structures described hereinabove may be readily situated on a face of the appliance.

As such, similar results are thereby afforded.

Figure 5:
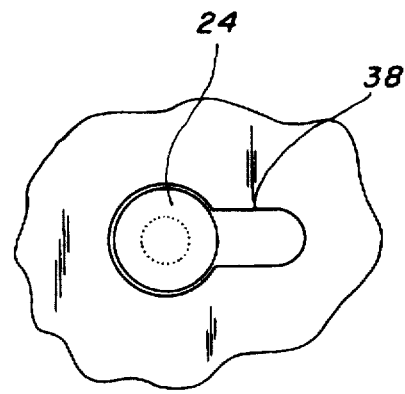
FIG. 5 is a top plan view of the securement pin and associated securement aperture with the pin not inserted within the aperture.
Figure 6:
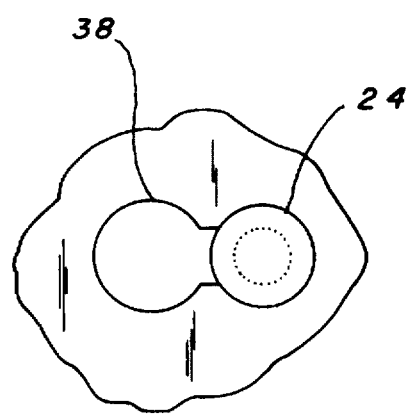
FIG. 6 is yet another top plan view of the securement pin and associated securement aperture with the pin inserted within the aperture.

Also included is a versatile power mechanism 28 with a cylindrical configuration. The power mechanism has a top face 30, a bottom face 32, and a periphery formed therebetween. The height of the power mechanism does not exceed 12 inches. The power mechanism also has an annular flange 34 integrally formed on the bottom face of the power mechanism. For allowing the convenient transportation of the power mechanism, a pair of upwardly extending handles 36 are coupled to an upper surface of the flange at opposite ends thereof. A plurality of securement apertures 38 are situated on the flange to releasably receive the securement pins of the lawn mower thus allowing the selective securement of the power mechanism to the top face of the lawn mower. Ideally, as shown in FIGS. 5 & 6, each securement aperture includes a first circular portion having a diameter equal to the diameter of each disk of the securement pins. Each aperture further includes a second oval portion formed adjacent thereto with a thickness equal to that of the each post of the securement pins. A plurality of additional apertures 40 are also formed in the flange. Upon the securement of the securement pins within the securement apertures, such apertures are in alignment with the apertures of the top face of the lawn mower. Further included are a plurality of coupling pins 42 adapted to releasably insert within the apertures of the power mechanism and the lawn mower. These pins thus further secure the power mechanism to the top face of the lawn mower. It should be noted that the thickness of the flange is determined so that it remains flush with the top face of the lawn mower when attached thereto.

The power mechanism further has a threaded rotor 44 extending from the bottom face thereof. The rotor is adapted to rotate upon the activation thereof. The rotor is further adapted to insert within the drive aperture of the lawn mower in use. A power cord 46 is included with a first end coupled to the top face of the power mechanism. A second end of the power cord is releasably couplable to a conventional alternating current receptacle for receiving power therefrom. The cord preferably consists of a 10 gauge, 100 foot, double insulated, and further light weight-type. Finally, a power switch 48 is situated on the top face of the power mechanism and is adapted to allow the selective activation of the power mechanism. As such, the power switch allows the rotor to provide mechanical motion to the lawn mower. In use, the power mechanism may be releasably situated on a plurality of outdoor appliances for providing mechanical motion thereto.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved versatile power mechanism for use with a lawn mower comprising, in combination:

a lawn mower with a generally rectangular configuration having a closed top face, an open bottom face, and a periphery formed therebetween with a plurality of wheels rotatably coupled thereto for allowing maneuvering of the lawn mower and a handle pivotally coupled thereto for further facilitating such maneuvering, the top face of the lawn mower having a first inset circular portion centrally formed therein, a second inset circular portion centrally formed in the first inset circular portion, and a drive aperture formed centrally in the second inset circular portion, the top face of the lawn mower further having a plurality of securement pins coupled to the first inset circular portion and extending upwardly therefrom and a plurality of apertures formed in the first inset circular portion; and a versatile power mechanism with a cylindrical configuration having a top face, a bottom face, and a periphery formed therebetween, the power mechanism having an annular flange integrally formed on the bottom face of the power mechanism, a pair of handles coupled to an upper surface of the flange at opposite ends of the power mechanism for allowing the convenient transportation thereof, a plurality of securement apertures positioned on the flange and adapted to releasably receive the securement pins of the lawn mower thus allowing the selective securement of the power mechanism to the top face of the lawn mower, a plurality of apertures formed in the flange in alignment with the apertures of the top face of the lawn mower upon the securement of the securement pins within the securement apertures, and a plurality of coupling pins adapted to releasably insert within the apertures of the power mechanism and the lawn mower thus further securing the power mechanism to the top face of the lawn mower, the power mechanism further having a threaded rotor extending from the bottom face thereof and adapted rotate upon the activation thereof with the rotor further adapted to insert within the drive aperture of the lawn mower, a power cord with a first end coupled to the top face of the power mechanism and a second end releasably coupleable to a conventional alternating current receptacle for receiving power therefrom, and a power switch situated on the top face of the power mechanism and adapted to allow the selective activation of the power mechanism thus providing mechanical motion to the lawn mower, whereby the power mechanism may be releasably situated on a plurality of outdoor appliances for providing mechanical motion thereto.

2. A versatile power mechanism for use with at least one outdoor appliance comprising:

at least one outdoor appliance; and a versatile power mechanism releasably coupleable to the at least one outdoor appliance, the power mechanism having a rotor extending therefrom and adapted to rotate upon the activation thereof, a power cord with a first end coupled to the power mechanism and a second end releasably coupleable to a conventional alternating current receptacle for receiving power therefrom, and a power switch situated on the top face of the power mechanism and adapted to allow the selective activation of the power mechanism thus providing mechanical motion to the at least one outdoor appliance, the power mechanism having an annular flange mounted thereon;

wherein the power mechanism includes a pair of upwardly extending handles coupled to the annular flange for allowing the convenient transportation thereof.

* * * * *